United States Patent
Rowe et al.

(10) Patent No.: US 6,837,055 B2
(45) Date of Patent: Jan. 4, 2005

(54) GAS TURBINE ENGINE CONTROL SYSTEM

(75) Inventors: Arthur L Rowe, Derby (GB); Michael A Horswill, Chester (GB)

(73) Assignee: Rolls-Royce plc, London (GB)

( * ) Notice: Subject to any disclaimer, the term of this patent is extended or adjusted under 35 U.S.C. 154(b) by 92 days.

(21) Appl. No.: 10/408,362

(22) Filed: Apr. 8, 2003

(65) Prior Publication Data

US 2003/0192316 A1 Oct. 16, 2003

(30) Foreign Application Priority Data

Apr. 12, 2002 (GB) .............................. 0208432

(51) Int. Cl.$^7$ .............................. F02C 9/00
(52) U.S. Cl. .............. 60/773; 60/39.281; 60/794
(58) Field of Search .............. 60/39.281, 773, 60/794, 803

(56) References Cited

U.S. PATENT DOCUMENTS

| | | | |
|---|---|---|---|
| 4,252,498 A | 2/1981 | Radcliffe | |
| 5,477,670 A | 12/1995 | Ikeda | |
| 6,364,602 B1 | * 4/2002 | Andrew et al. | 415/1 |
| 6,708,496 B2 | * 3/2004 | Gadde et al. | 60/773 |
| 6,715,916 B2 | * 4/2004 | Tomlinson et al. | 60/803 |

* cited by examiner

*Primary Examiner*—Louis J. Casaregola
(74) *Attorney, Agent, or Firm*—W. Warren Taltavull; Manelli Denison & Selter PLLC (57) ABSTRACT

An apparatus and method for controlling a gas turbine engine involves calculating a simple corrected speed value for the engine using values of compressor speed and inlet stagnation temperature of the compressor. This simple corrected speed value is then adjusted to take into account the water vapour concentration at the inlet to the compressor. This results in a more accurate value of corrected speed for the compressor, which may be used to modulate the fuel supply to a combustor of the engine or to control the geometry of one or more variable compressors in the engine.

19 Claims, 6 Drawing Sheets

GAS TURBINE ENGINE CONTROL SYSTEM

The invention relates to an apparatus and method for controlling a gas turbine engine.

It is conventional to use various non-dimensional parameter groups in the characterisation and control of gas turbine engine performance. The use of such dimensionless groups reduces the large number of parameters which determine gas turbine engine performance to a smaller number of dimensionless parameter groups.

An important dimensionless parameter group relates to the engine speed. This "corrected" speed is commonly used for indication and control of engine power or thrust on some engines; and for controlling engine variable geometry features, such as variable compressor stator vanes.

In addition, most small turbofan engines use a measure of corrected low pressure compressor (fan) speed as a measure of engine thrust. This corrected low pressure compressor speed is also used in some larger engines, particularly where the nozzle pressure ratios are low and difficult to use as an accurate measurement of thrust.

Most engines with variable compressor stator vanes use a measure of the compressor corrected speed as the basic parameter for controlling the variable vane angles.

The true or pure form of the dimensionless group relating to corrected speed is that which relates the blade speed of the relevant compressor to the local speed of sound:

$$\text{i.e., Corrected Speed} = \frac{U}{a},$$

which is equal to $$\frac{U}{\sqrt{\gamma R t}}$$

which is equal to $$\frac{Nr}{\sqrt{\gamma R t}}$$

where:

U=Mean Blade Speed
a=Local Speed of Sound
γ=Ratio of Specific Heats for Gas
R=Gas Constant
t=Local Static Temperature
T=Stagnation Temperature
N=Rotational Speed of Compressor (rad/sec)
r=Mean Radius of Compressor Blades However, the form of corrected speed normally used for indication and control in gas turbine engines is simplified in that it only uses the rotational speed and stagnation temperature. This simplified form is related to the pure corrected speed shown above in the following way.

$$\text{Simplified Corrected Speed, } \frac{N}{\sqrt{T}} = \frac{Nr}{\sqrt{\gamma R t}} \times \sqrt{\frac{t}{T}} \times \frac{\sqrt{\gamma R}}{r}$$

In assuming that the above simplified corrected speed value is acceptable, it is normally assumed that the total (stagnation) to static temperature ratio $$\left(\frac{T}{t}\right),$$

which is related to Mach Number, is fixed at a particular value of $$\frac{N}{\sqrt{T}}$$

and that the compressor radius is constant. It is further assumed that the group $\sqrt{\gamma R}$ which relates to the gas properties is also constant. In such circumstances, it may be seen from the above equation that there is a fixed relationship between the simplified corrected speed $$\frac{N}{\sqrt{T}}$$

and the pure form of corrected speed.

According to the invention there is provided a control apparatus for a gas turbine engine, the control apparatus including:- means for determining a compressor speed of a compressor of the gas turbine engine;

means for determining a compressor inlet stagnation temperature for the compressor;

means for determining a water vapour concentration in the inlet air to the compressor;

means for calculating a simple corrected speed value using the values of compressor speed and inlet stagnation temperature; and means for adjusting the value of simple corrected speed depending upon the water vapour concentration to produce a value of improved corrected speed.

The apparatus ray include a probe for providing a measurement of relative humidity, for use in determining water vapour concentration. The probe may also provide an indication of compressor inlet stagnation temperature.

Preferably the apparatus includes means for adjusting the simple corrected speed by a humidity correction factor, the humidity correction factor being dependent upon the value of water vapour concentration, the relationship between the humidity correction factor and the water vapour concentration being obtained from a lookup table.

Preferably the apparatus includes means for measuring the compressor inlet stagnation pressure. Preferably the apparatus further includes means for calculating the water vapour concentration by dividing a value of the partial pressure of water by the measured inlet stagnation pressure.

Preferably the apparatus includes means for calculating the partial pressure of water from the relative humidity, and a saturation pressure or water, Psat. The apparatus may include means for obtaining a value of Psat at the measured inlet stagnation temperature. These means may include a lookup table relating Psat to inlet stagnation temperature.

The control apparatus may further include means for modulating the fuel supply to a combustor of the gas turbine engine, in dependence upon the value of the improved corrected speed.

Alternatively, or additionally, the control apparatus may include means for controlling the geometry of one or more variable compressors in dependence upon the value of the improved corrected speed.

According to the invention there is further provided a gas turbine engine including one or more compressors, a combustor and one or more turbines, the gas turbine engine including a control apparatus according to any of the preceding definitions.

The gas turbine engine may include means for modulating the fuel supply to the combustor in dependence upon the improved corrected speed value. Alternatively, or additionally, the gas turbine engine may include means for controlling the geometry of one or more compressors in dependence upon the improved corrected speed value.

According to the invention, there is provided a method or controlling a gas turbine engine including one or more compressors, a combustor and one or more turbines, the method including the steps of:

determining a compressor speed of a compressor of the gas turbine engine;

determining a compressor inlet stagnation temperature for the compressor;

measuring a water vapour concentration in the inlet air to the compressor;

calculating a simple corrected speed value using the values of compressor speed and inlet stagnation temperature; and adjusting the value of simple corrected speed depending upon the water vapour concentration to produce a value of improved corrected speed.

The simple corrected speed value may be equal to the compressor speed divided by the square root of the compressor inlet stagnation temperature.

Preferably the simple corrected speed is adjusted by a humidity correction factor, the humidity correction factor being dependent upon a value of molar concentration of water vapour, the relationship between the humidity correction factor and the molar concentration of water vapour being obtained from a lookup table.

The method may also include the step of measuring the inlet stagnation pressure, P, of the compressor. The molar concentration of water vapour may be calculates by dividing a value of the partial pressure of water by the measured inlet stagnation pressure, P.

The partial pressure of water may be calculated from the water vapour concentration, H, and a saturation pressure of water, Psat. The saturation pressure of water, Psat, may be obtained from a lookup table relating Psat to the inlet stagnation temperature, T.

The method may further include the step of modulating the fuel supply to the combustor, in dependence upon the value of the improves corrected speed.

Alternatively or additionally the method may include the step of controlling the geometry of one or more variable compressors of the gas turbine engine in dependence upon the value of the improved corrected speed.

An embodiment of the invention will be described for the purpose of illustration only with reference to the accompanying drawings in which:-

Figure 1:
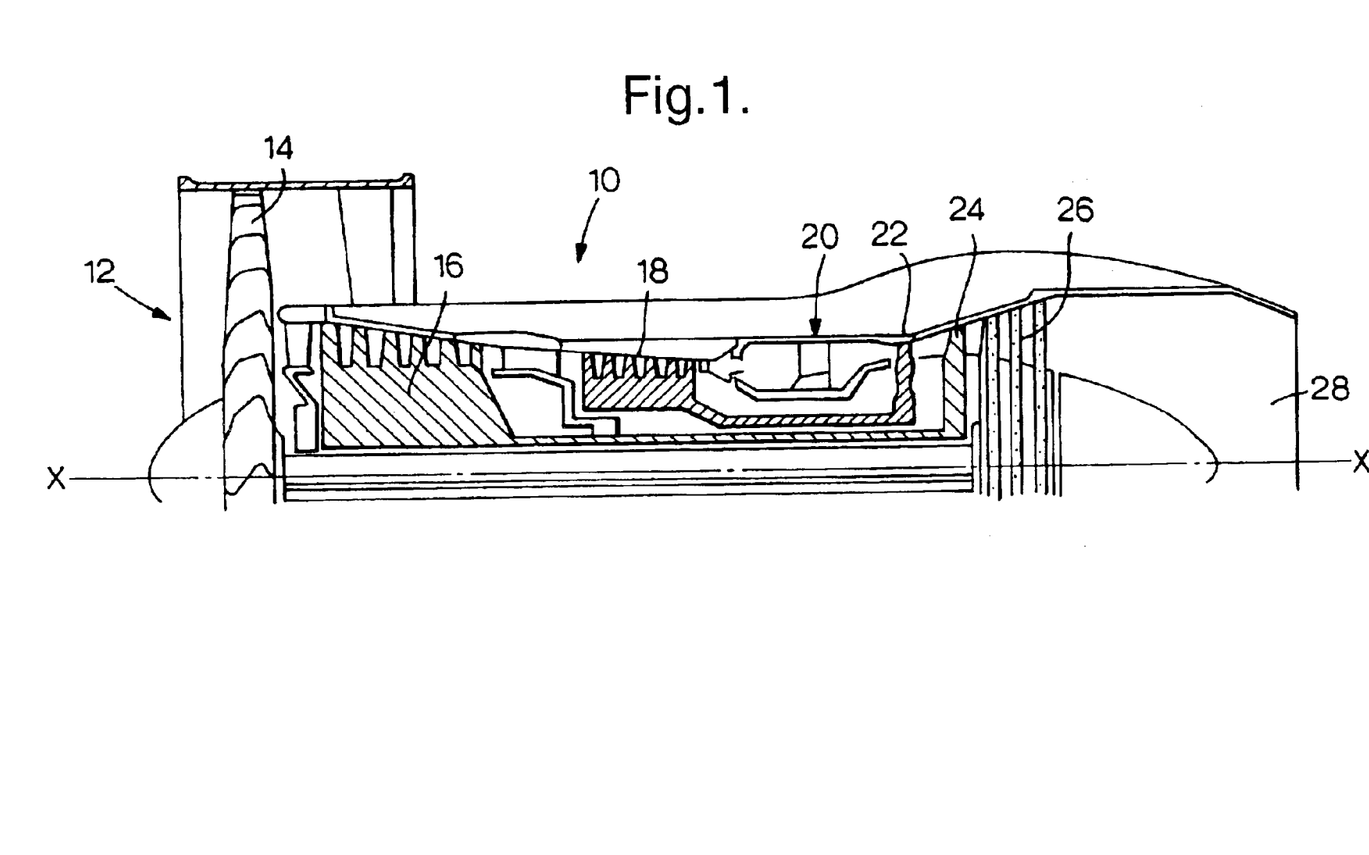
FIG. 1 is a diagrammatic sectional view of a conventional ducted fan gas turbine engine.

With reference to FIG. 1, a gas turbine engine generally indicated at 10 comprises, in axial flow series, an air intake 12, a propulsive fan 14, an intermediate pressure compressor 16, a high pressure compressor 18, combustion equipment 20, a high pressure turbine 22, an intermediate pressure turbine 24, a low pressure turbine 26 and an exhaust nozzle 28.

The gas turbine engine 10 works in the conventional manner so that air entering the intake 12 is accelerated by the fan 14 to produce two airflows, a first airflow into the intermediate pressure compressor 16 and a second airflow which provides propulsive thrust. The intermediate pressure compressor 16 compresses the airflow directed into it before delivering the air to the high pressure compressor 18 where further compression takes place.

The compressed air exhausted from the high pressure compressor 18 is directed into the combustion equipment 20 where it is mixed with fuel and the mixture combusted. The resultant hot combustion products then expand through and thereby drive the high, intermediate and low pressure turbines 22, 24 and 26 before being exhausted through the nozzle 28 to provide additional propulsive thrust. The high, intermediate and low pressure turbines 22, 24 and 26 respectively drive the high and intermediate pressure compressors 16 and 18 and the fan 14 by suitable interconnecting shafts.

Figure 2:
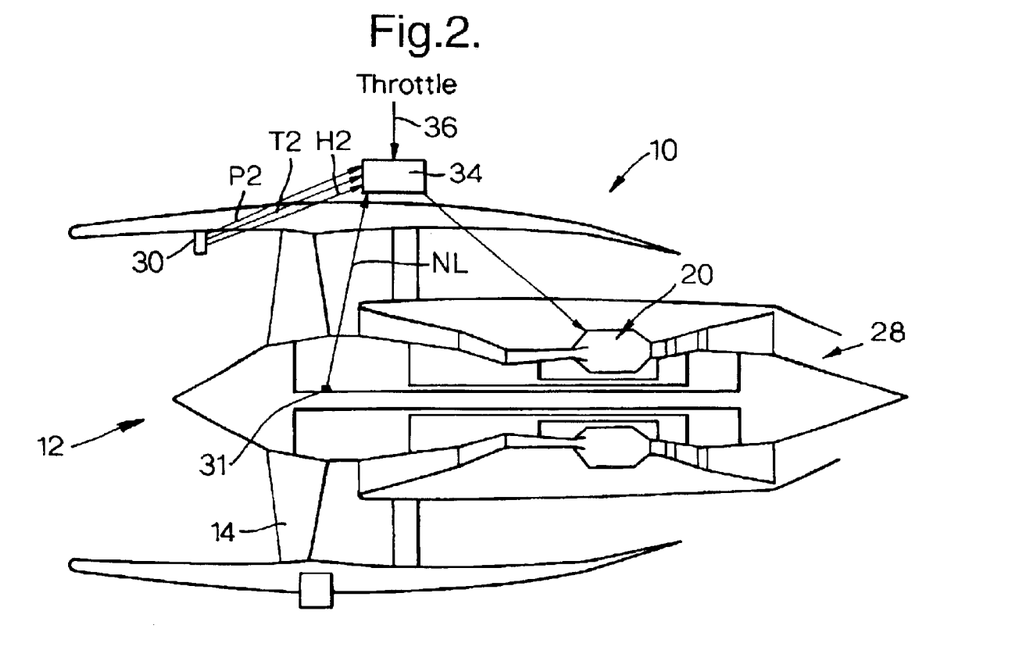
FIG. 2 is a diagrammatic sectional view of a turbofan engine incorporating control apparatus according to a first embodiment of the invention.

FIG. 2 illustrates a turbofan engine 10 incorporating apparatus according to a first embodiment of the invention. Equivalent parts to those in FIG. 1 are given the same reference numerals. The engine 10 incorporates a probe 30 in an inlet duct 32 of the fan, 14. The probe 30 produces signals indicative of inlet stagnation pressure, P2, inlet stagnation temperature, T2 and the relative humidity, H2, of air in the probe at the stagnation pressure and temperature of the inlet airflow. Further details in relation to the probe 30 are provided hereinafter.

The engine 10 is also provided with a sensor 31, which provides an output indicating the rotation speed, NL, of the fan 14.

The engine 10 includes a control system 34 which is able to control fuel supply to the combustion equipment 23 of the engine 10. The control system 34 adjusts the fuel supply such that the engine 10 provides the desired thrust according to a throttle input 36 to the control system 34.

The control system 34 uses a value of improved corrected speed of the fan 14 as a measure of engine thrust. The control system utilises the signals P2, T2 and H2 from the probe 30 and the signal NL provided by the sensor 31.

Figure 3:
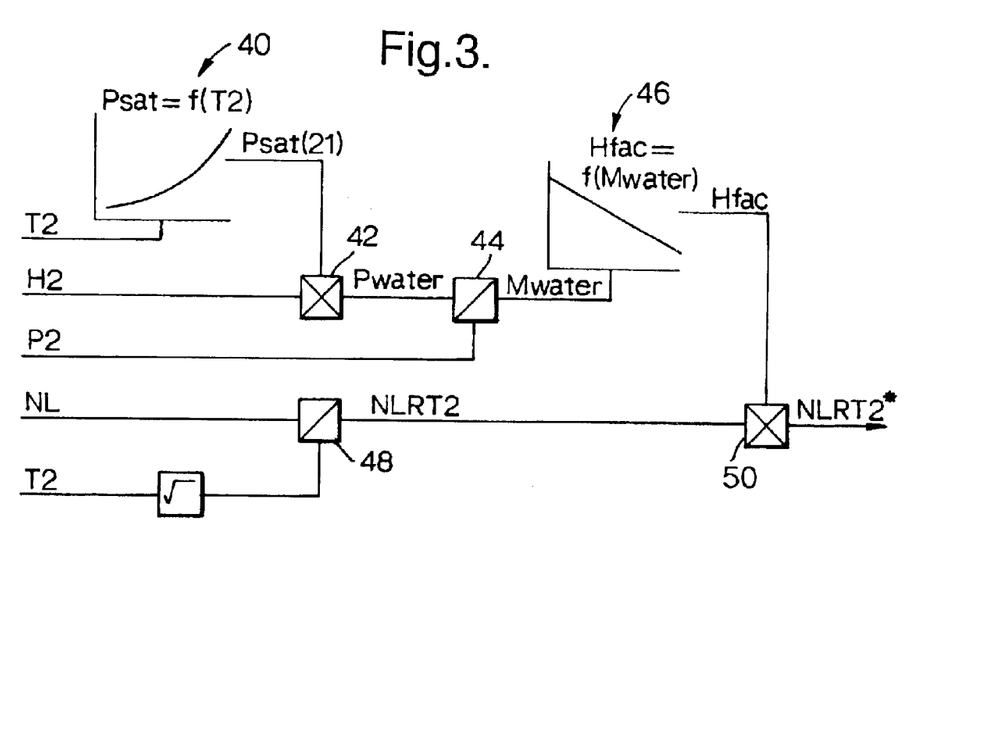
FIG. 3 is a flow diagram illustrating the method of use of the control apparatus in controlling the engine of FIG. 1.

The control system 34 calculates the improved fan corrected speed $$\frac{NL^*}{\sqrt{T}}$$

by the following method, illustrated in FIG. 3.

1) The saturation pressure of water, Psat, is calculated by a table lookup (indicated by reference number 40), at the measured inlet stagnation temperature, T2.

2) The actual partial pressure of water, Pwater, is calculated by multiplying the saturation pressure of water from step 1 above) by the relative humidity, H2, (step 42 in FIG. 3).

3) The water vapour concentration (molar concentration of water vapour, Mwater) is obtained by dividing the actual partial pressure of water, Pwater, by the measured inlet stagnation pressure, 32 (step 44 in FIG. 3).
4) The humidity correction factory, Hfac, is calculated by a table lookup (indicated 46 in FIG. 3 ) relating Hfac to the calculated molar concentration of water vapour, Mwater.
5) The simple fan corrected speed, NLRT2 is calculated from the measured rotational speed of the fan NL and the inlet stagnation temperature T2 (step 48 in FIG. 3).
6) The improved fan corrected speed, NLRT2*, is Calculated by multiplying together the simple corrected speed, NLRT2, and the humidity correction factor, Hfac (step 50 FIG. 3).

Figure 4:
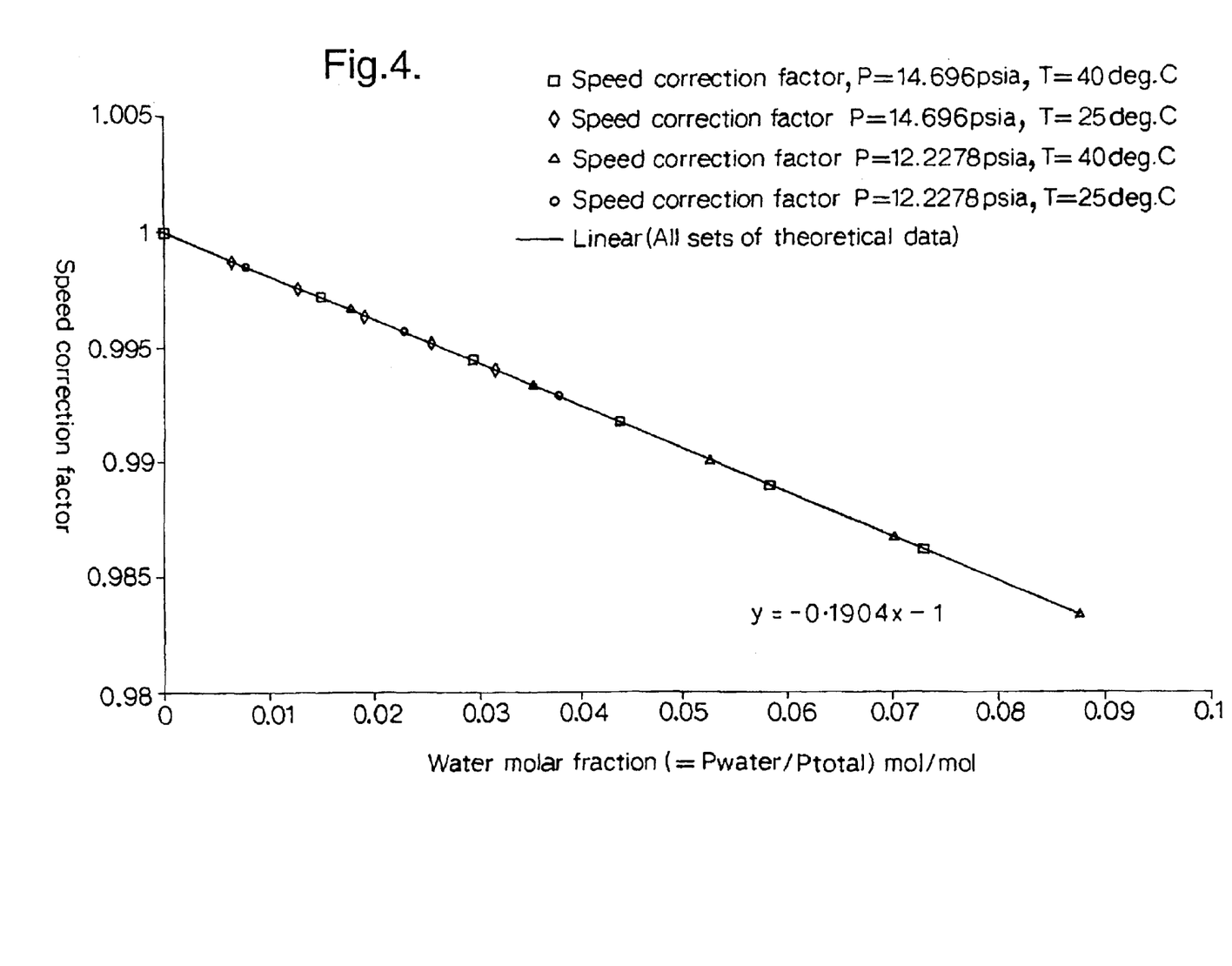
FIG. 4 is a table of humidity correction factor against molar concentration of water.

A typical graph of humidity correction factor, Hfac, against molar concentration of water vapour, Mwater, is illustrated in FIG. 4.

The control system 34 then modulates the fuel supply to the combustion equipment 20, to achieve the desired true fan corrected speed, NLRT2*, in a conventional manner.

Figure 5:
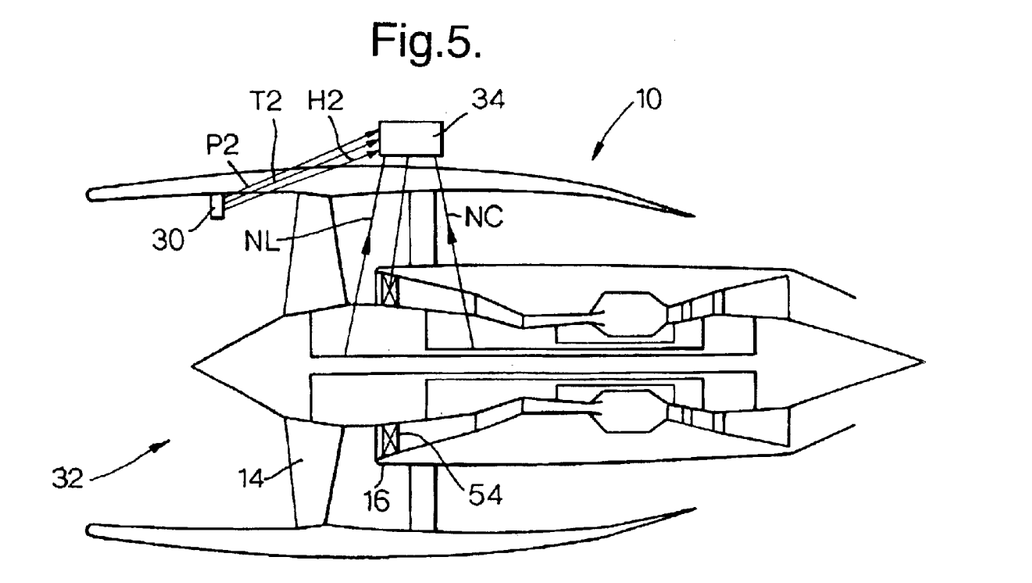
FIG. 5 is a diagrammatic sectional view of a turbofan engine incorporating control apparatus according to a second embodiment of the invention.

Referring to FIG. 5, an alternative embodiment of the invention is illustrated. FIG. 5 shows a fan engine 10 which has variable compressor geometry. The engine 10 includes at least one core compressor 16 fitted with variable geometry vanes 42 located at its forward end.

A control system 34 controls the position of the variable geometry vanes 54 by actuation means (not illustrated).

The engine 10 is again fitted with a probe 30 in the inlet duct 32 in front of the fan 12. The probe 30 produces signals indicative of inlet stagnation pressure P2, inlet stagnation temperature T2 and relative humidity H2, as described in relation to the FIG. 2 embodiment.

Figure 6:
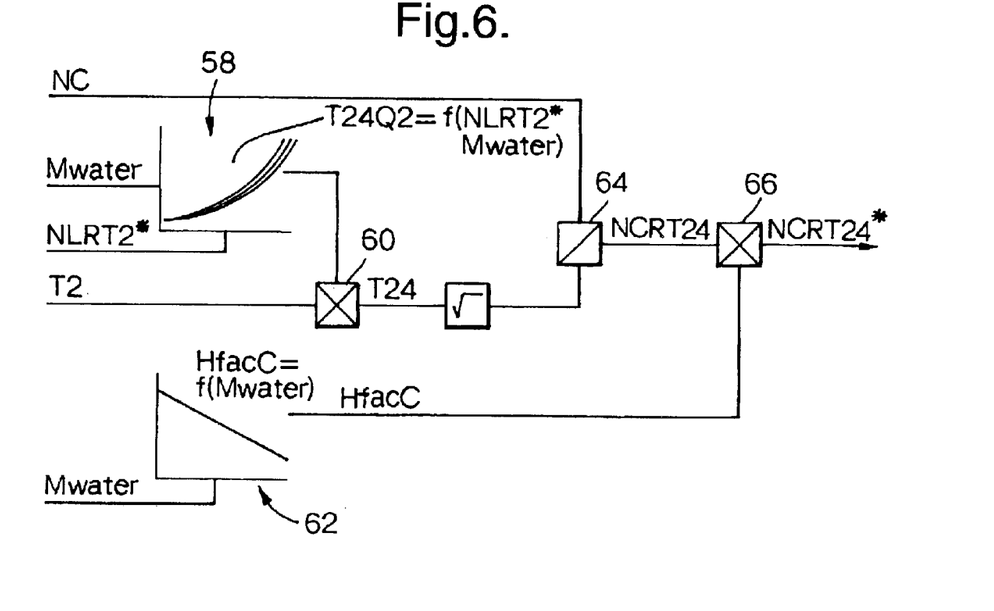
FIG. 6 is a flow diagram illustrating the method of use of the control apparatus in controlling the engine of FIG. 5.

The control system 34 uses the improved corrected speed of the core compressor 16 as a measure of local blade Mach Number and the basis for controlling the variable geometry vanes 54. In addition to the signals from the inlet probe 30, the rotational speed, NL, of the fan 14 and the rotational speed, NC, of the core compressor 16 are sensed by the control system 34. The control system 34 calculates the improved core compressor corrected speed $$\frac{NC^*}{\sqrt{T}}$$

by the following method, illustrated in FIG. 6.

1) The molar concentration of water vapour, Mwater, is calculated according to the method described above.
2) The true fan corrected speed, NLRT2*, is calculated as described above in relation to the FIGS. 2 and 3 embodiments.
3) The fan temperature ratio, T24Q2, is evaluated from a graphical lookup (indicated 58 in FIG. 6) using the true fan corrected speed, NLRT2*, and molar concentration of water vapour, Mwater.
4) The core inlet temperature, T24, is calculated by multiplying the inlet stagnation temperature, T2, and the fan temperature ratio, T24Q2 (step 60 in FIG. 6).
5) The core humidity correction factor, Hfac, is calculated from a table lookup (indicating at 62 in FIG. 3) relating Hfac to the calculated molar concentration of water vapour, Mwater.
6) The normal core corrected speed, NCRT24, is calculated from the measured rotational speed of the core, NC, and core inlet temperature, T24 (step 64).
7) The true core corrected speed NCRT24* is calculated by multiplying together the normal core corrected speed NCRT24 and the core humidity correction factor, HfacC (step 66).

The relationship between the core humidity correction factor, HfacC and the molar concentration of water vapour, Mwater will be similar to that shown in FIG. 4.

The control system 34 then modulates the position of the variable geometry vanes 54 through the actuation means to achieve the desired schedule against true core corrected speed, NCRT24*, in a conventional manner as used in the prior art.

The above embodiment assumes that the core inlet temperature, T24, is calculated from the engine inlet stagnation temperature, T2, and the fan speed with small corrections for humidity. An alternative embodiment uses a direct measurement of core inlet temperature thus bypassing steps 2)–4) outlined above.

The above embodiments utilise a probe 30 which is able to measure the relative humidity, H2, of the air in the probe at the inlet stagnation pressure, P2, and temperature, T2, of the inlet air flow.

Figure 7:
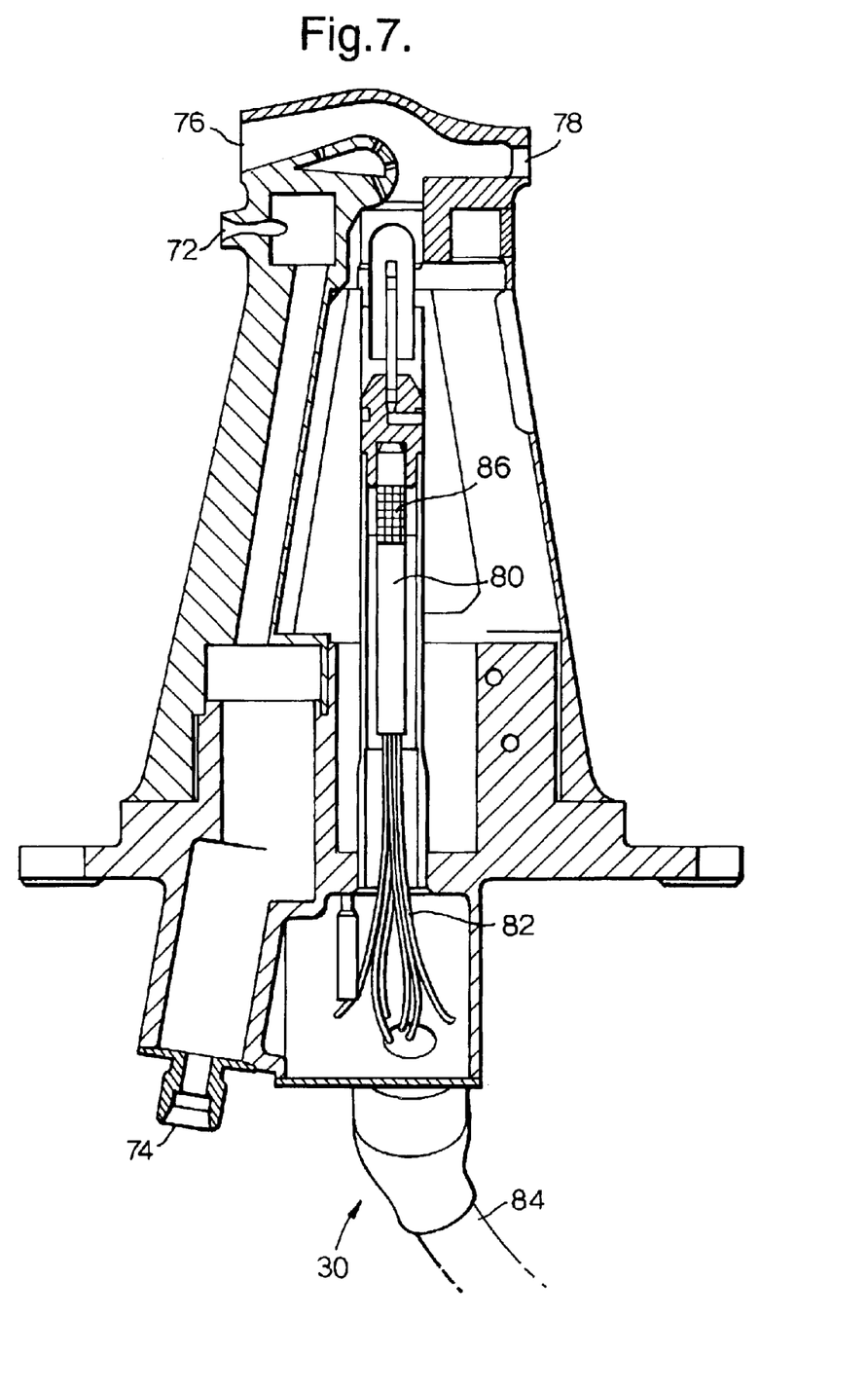
FIG. 7 is a diagrammatic sectional view of a humidity sensor suitable for use with the apparatus and method of the invention.

FIG. 7 is a diagrammatic cross-sectional view of an typical inlet probe 30 suitable for use in accordance with the invention. The probe 30 senses inlet stagnation pressure through a tapping 72, which is led out to an external union connection 74; there is no flow through this system. Air flows into the probe through a probe inlet 76, and out through a probe outlet 78, carrying with it all the liquid water entering through the inlet 76. A small amount of dry air flow passes around an inlet stagnation temperature sensor 80, with electrical signals to and from the sensor being led out through cables 82 and harness 84.

The probe 30 further includes a small thermoset polymer-based relative humidity sensor 86 fitted adjacent to the inlet stagnation temperature sensor 80. In order to prevent spurious humidity readings, the sensor 86 should be protected from contact with liquid water. Installation adjacent to the inlet stagnation temperature sensor 80 for which the requirements are similar should ensure that this condition is satisfied.

Figure 8:
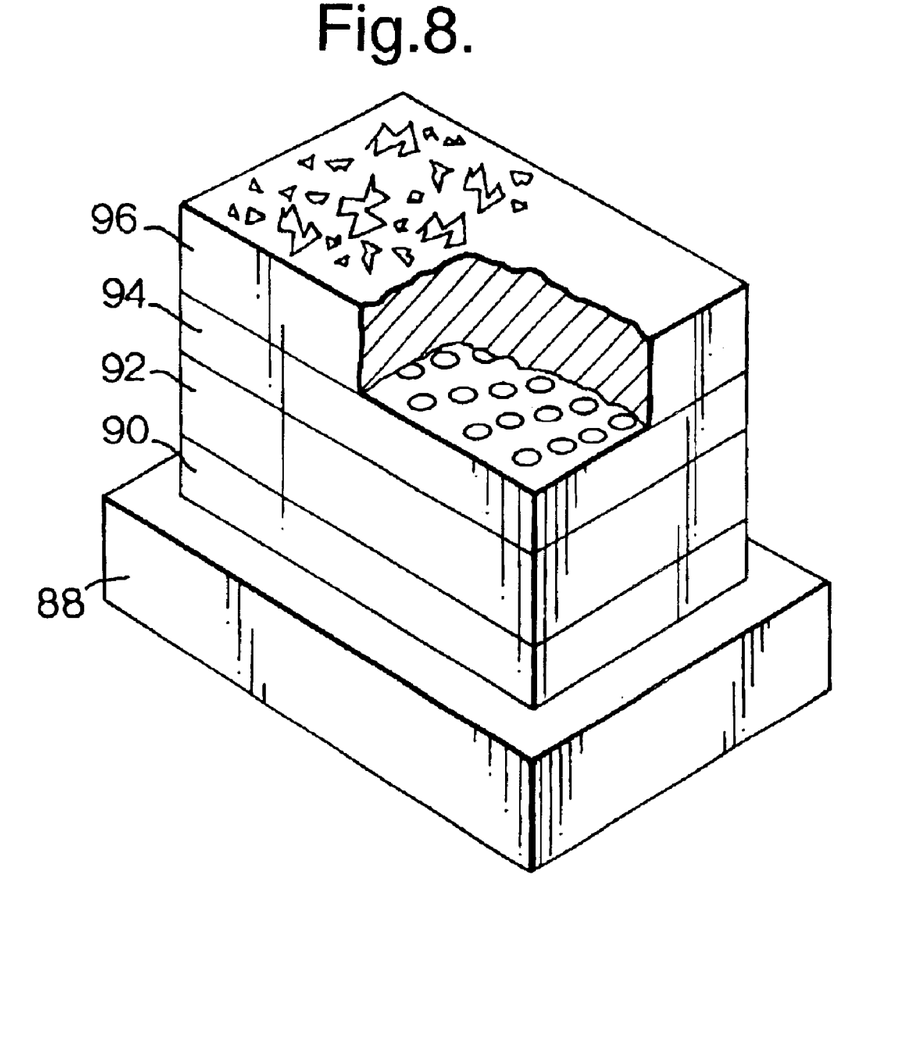
FIG. 8 is a diagrammatic view of part of a humidity sensor, illustrating its construction.

FIG. 8 is a diagrammatic, part cut-away, perspective sketch showing the construction of the sensor 80.

The sensor 86 includes layers of silicon substrate 88, platinum 90, thermoset polymer 92, porous platinum 94 and thermoset polymer 96.

There is thus provided a control system which takes into account atmospheric water vapour in the fan inlet. This greatly improves the accuracy of the corrected speed used for control of fuel to the combustors or of compressor geometry. The assumption that $\sqrt{\gamma R}$ is constant can be significantly in error in the presence of atmospheric water vapour, leading to errors in indicated and controlled "corrected" speeds in the presence of high levels of water vapour. It is this aspect of the prior art that the invention aims to address. The errors arise because water vapour has a lower molecular weight than air, and as a consequence it has a larger value of gas constant R. The gas constant, R, is defined as follows:

$$R = \frac{R_{universal}}{MW}$$

where $R_{universal}$=Universal Gas Constant
MW=Molecular Weight of Gas (Air=28.9645, Water Vapour=18.0153)

Mixtures of water vapour and air therefore have a lower molecular weight and higher value for R than that for dry air.

Concentrations of water vapour up to about 7% by volume in air can be found under some circumstances. The higher value of R under these circumstances means that the value of $$\frac{N}{\sqrt{T}}$$

gives a misleading high indication of the blade Mach Number in humid air. Further small effects attributable to changes in the value of γ also contribute to differences in Mach Number and Pressure Ratio at a value of $$\frac{N}{\sqrt{T}}.$$

In current engine control systems, this effect of humidity on the true corrected speed is ignored, with the consequence that there can be a discrepancy between indicated and true corrected speed of as much as 1.4% under some conditions.

If the corrected speed is the LP speed on a turbofan engine which is being used as a thrust indication, this discrepancy can be equivalent to a thrust shortfall of over 3%. In order to ensure that there is no shortfall of thrust under these circumstances, it may be necessary to increase the engine thrust rating by an equivalent amount, incurring higher operating speeds and temperatures in dry conditions with a consequential reduction in engine life.

If the corrected speed is being used to control variable compressor geometry, then this discrepancy can be equivalent to a vane malschedule of about 4 degrees open, which is likely to result in reduced surge margin and lowered efficiency in that compressor.

The invention aims to use a measurement of humidity so that due allowance for the effects on corrected speeds of changes in gas properties may be made, so that thrust indication and control of compressor variables is not compromised by the presence of water vapour in the inlet air flow.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A control apparatus for a gas turbine engine, the control apparatus including:
    means for determining a compressor speed of a compressor of the gas turbine engine;
    means for determining a compressor inlet stagnation temperature for the compressor;
    means for determining a water vapour concentration in the inlet air to the compressor;
    means for calculating a simple corrected speed value using the values of compressor speed and inlet stagnation temperature; and
    means for adjusting the value of simple corrected speed depending upon the water vapour concentration to produce a value of improved corrected speed.

2. A control apparatus according to claim 1 including a probe for providing a measurement indicative of relative humidity, for use in determining water vapour concentration.

3. A control apparatus according to claim 2 wherein the probe also provides an indication of compressor inlet stagnation temperature.

4. A control apparatus according to claim 2 wherein the apparatus includes means for adjusting the simple corrected speed by a humidity correction factor, the humidity correction factor being dependent upon the value of water vapour concentration, the relationship between the humidity correction factor and the water vapour concentration being obtained from a lookup table.

5. A control apparatus according to claim 4 wherein the apparatus includes means for measuring the compressor inlet stagnation pressure and means for calculating the water vapour concentration by dividing a value of the partial pressure of water by the measured inlet stagnation pressure.

6. A control apparatus according to claim 5 wherein the apparatus includes means for calculating the partial pressure of water from the relative humidity and the saturation pressure of water, Psat.

7. A control apparatus according to claim 6 wherein the apparatus includes means for obtaining a value of Psat at the measured inlet stagnation temperature, these means including a look-up table relating Psat to inlet stagnation temperature.

8. A control apparatus according to claim 1, the control apparatus including means for modulating the fuel supply to a combustor of the gas turbine engine, in dependence upon the value of the improved corrected speed.

9. A control apparatus according to claim 1, the control apparatus including means for controlling the geometry of at least one compressor in dependence upon the value of the improved corrected speed.

10. A gas turbine engine including at least one compressor, a combustor and one or more turbines, the gas turbine engine including a control apparatus according o claim 1.

11. A gas turbine engine according to claim 10, the gas turbine engine including means for modulating the fuel supply to the combustor in dependence upon the improved corrective speed value.

12. A gas turbine engine according to claim 10, the gas turbine engine including means for controlling the geometry of at least one compressor in dependence upon the improved the corrected speed value.

13. A method for controlling a gas turbine engine including at least one compressor, a combustor and at least one turbine, the method including the steps of:
    determining a compressor speed of a compressor of the gas turbine engine;
    determining a compressor inlet stagnation temperature for the compressor;
    measuring a water vapour concentration in the inlet air to the compressor;
    calculating a simple corrected speed value using the values of compressor speed and inlet stagnation temperature; and
    adjusting the value of simple corrected speed depending upon the water vapour concentration to produce a value of improved corrected speed.

14. A method according to claim 13 wherein the simple corrected speed value is equal to the compressor speed divided by the square root of the compressor inlet stagnation temperature.

15. A method according to claim 13 wherein the simple corrected speed is adjusted by a humidity correction factor, the humidity correction factor being dependent upon the value of water vapour concentration, the relationship between the humidity correction factor and the water vapour concentration being obtained from a lookup table.

16. A method according to claim 15, the method including the step of measuring the inlet stagnation pressure of the compressor and calculating the water vapour concentration by dividing a value of the partial pressure of water by the measured inlet stagnation pressure.

17. A method according to claim 16 wherein the partial pressure of water is calculated from the relative humidity and a saturation pressure of water, Psat, the saturation pressure of water, Psat, being obtained from a look-up table relating Psat to the inlet stagnation temperature.

18. A method according to any of claim 13 the method further including the step of modulating the fuel supply to the combustor in dependence upon the value of the improved corrected speed.

19. A method according to claim 13 the method including the step of controlling the geometry of at least one variable compressor of the gas turbine engine in dependence upon the value of the improved corrected speed.

* * * * *